(12) United States Patent
Luo et al.

(10) Patent No.: US 11,071,158 B2
(45) Date of Patent: Jul. 20, 2021

(54) COMMUNICATION METHOD, COMMUNICATIONS DEVICE, AND COMMUNICATIONS SYSTEM THEREOF

(71) Applicant: HUAWEI TECHNOLOGIES CO., LTD., Guangdong (CN)

(72) Inventors: Haiyan Luo, Shanghai (CN); Yan Wang, Beijing (CN); Mingzeng Dai, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/708,595

(22) Filed: Dec. 10, 2019

(65) Prior Publication Data

US 2020/0113008 A1    Apr. 9, 2020

Related U.S. Application Data

(63) Continuation of application No. PCT/CN2018/116059, filed on Nov. 17, 2018.

(30) Foreign Application Priority Data

Nov. 17, 2017    (CN) .......................... 201711148247.8

(51) Int. Cl.
*H04W 72/00*    (2009.01)
*H04W 76/15*    (2018.01)
(Continued)

(52) U.S. Cl.
CPC ........... *H04W 76/15* (2018.02); *H04W 72/04* (2013.01); *H04W 76/12* (2018.02); *H04W 76/27* (2018.02); *H04W 88/06* (2013.01); *H04W 92/20* (2013.01)

(58) Field of Classification Search
CPC ... H04W 72/04; H04W 76/10; H04W 72/044; H04W 72/046
See application file for complete search history.

(56) References Cited

U.S. PATENT DOCUMENTS 10,499,398 B2 * 12/2019 Majmundar ........ H04W 72/046
2010/0165881 A1 * 7/2010 Hof .......................... H04L 45/10
370/254

(Continued)

FOREIGN PATENT DOCUMENTS

| CN | 105101285 A | 11/2015 |
|---|---|---|
| CN | 105338572 A | 2/2016 |
| WO | 2016071076 A1 | 5/2016 |

OTHER PUBLICATIONS

3GPP TS 38.401 V0.4.1 (Oct. 2017), "3rd Generation Partnership Project; Technical Specification Group Radio Access Network; NG-RAN; Architecture description (Release 15)," XP051391686, Oct. 2017, 25 pages.

(Continued)

*Primary Examiner* — Shantell L Heiber
(74) *Attorney, Agent, or Firm* — Fish & Richardson P.C.

(57) ABSTRACT

The present disclosure relates to communication methods. In one example method, a first network node sends, to a second network node on each of at least one user plane tunnel, a message for feeding back a downlink transmission status, where each message includes an indication used to indicate radio link outage or radio link resume between the first network node and a terminal device, and the at least one user plane tunnel is all user plane tunnels that are established at a communications interface between the first network node and the second network node and that are associated with the terminal device.

17 Claims, 6 Drawing Sheets

(51) Int. Cl.
*H04W 76/12* (2018.01)
*H04W 76/27* (2018.01)
*H04W 72/04* (2009.01)
*H04W 88/06* (2009.01)
*H04W 92/20* (2009.01)

(56) References Cited

U.S. PATENT DOCUMENTS

2016/0029421 A1   1/2016  Wang et al.
2017/0181203 A1*  6/2017  Shanks ............... H04L 63/029

OTHER PUBLICATIONS

3GPP TS 38.475 V0.3.0 (Oct. 2017), "3rd Generation Partnership Project; Technical Specification Group Radio Access Network; NG Radio Access Network (NG-RAN); F1 interface user plane protocol (Release15)," XP051391683, Nov. 2017, 16 pages.

Ericsson et al., "Details on fast retransmission of lost PDUs," 3GPP TSG-RAN WG3 Meeting #97bis, R3-173970, Prague, Czech Republic, XP051344382, Oct. 9-13, 2017, 4 pages.

Ericsson et al., "Details on fast retransmission of lost PDUs," 3GPP TSG-RAN WG3 Meeting #97bis, R3-174217, Prague, Czech Republic, XP051356892, Oct. 9-13, 2017, 3 pages.

Extended European Search Report issued in European Application No. 18879698.1 dated May 12, 2020, 9 pages.

Huawei, "Further discussions on radio link outage indication," 3GPP TSG-RAN3 Meeting # 98, R3-174482, Reno, Nevada, USA, Nov. 27-Dec. 1, 2017, 3 pages.

Huawei, "L1/L2 configuration for gNB-DU," 3GPP TSG RAN WG3 meeting #97, R3-173127, Berlin, Germany, Aug. 21-25, 2017, 3 pages (with English translation).

PCT International Search Report and Written Opinion issued in International Application No. PCT/CN2018/116059 dated Jan. 30, 2019, 17 pages (with English translation).

* cited by examiner

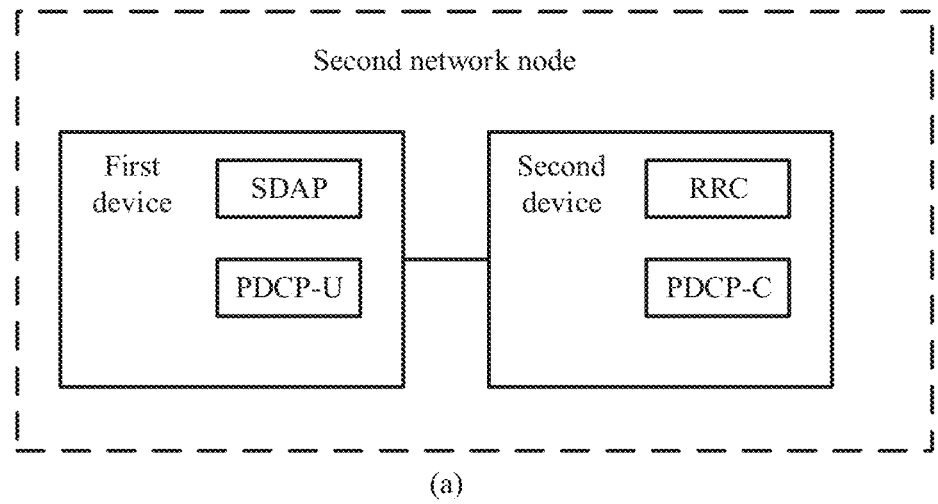
(a)
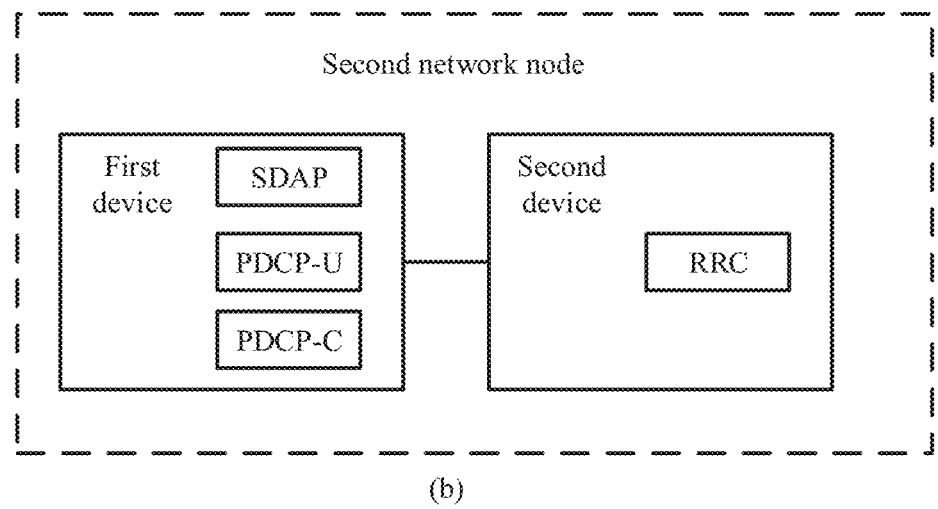
(b)
FIG. 5

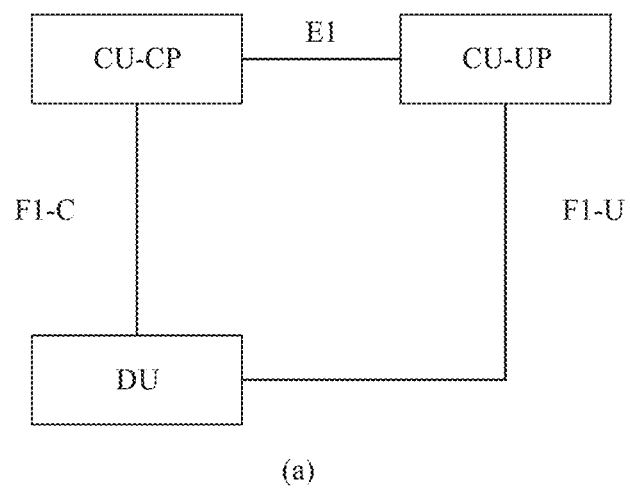
(a)
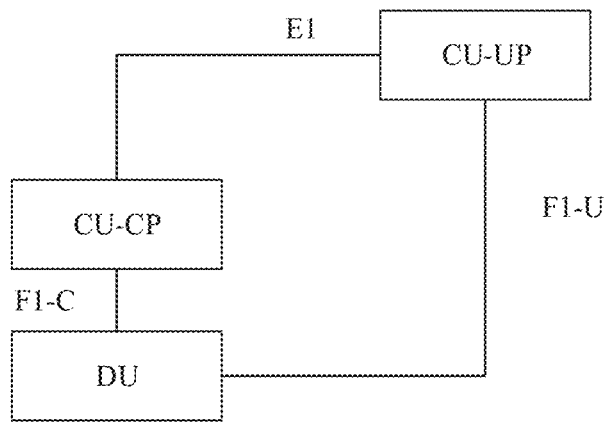
(b)
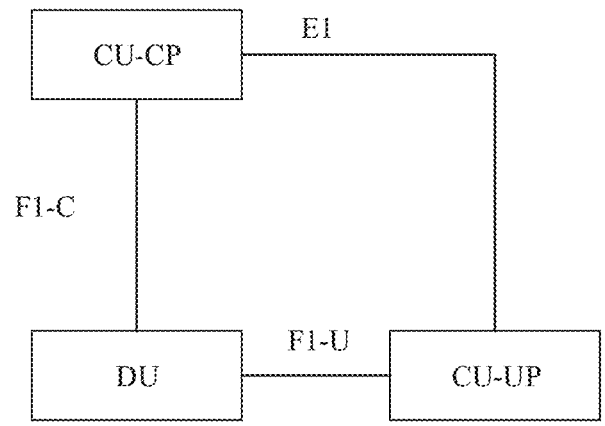
(c)
FIG. 6 (Continued to a next page)

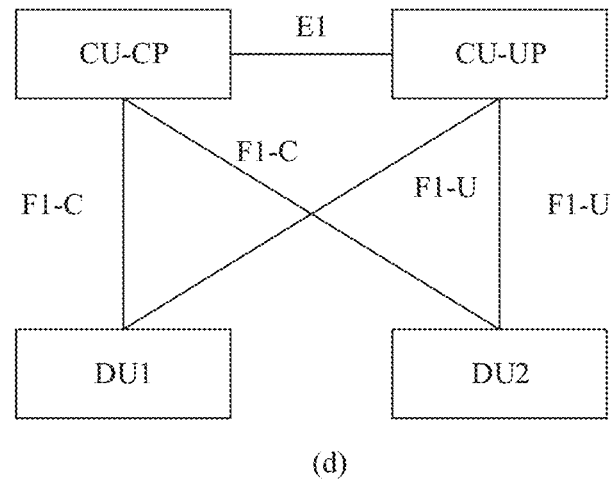
(d)
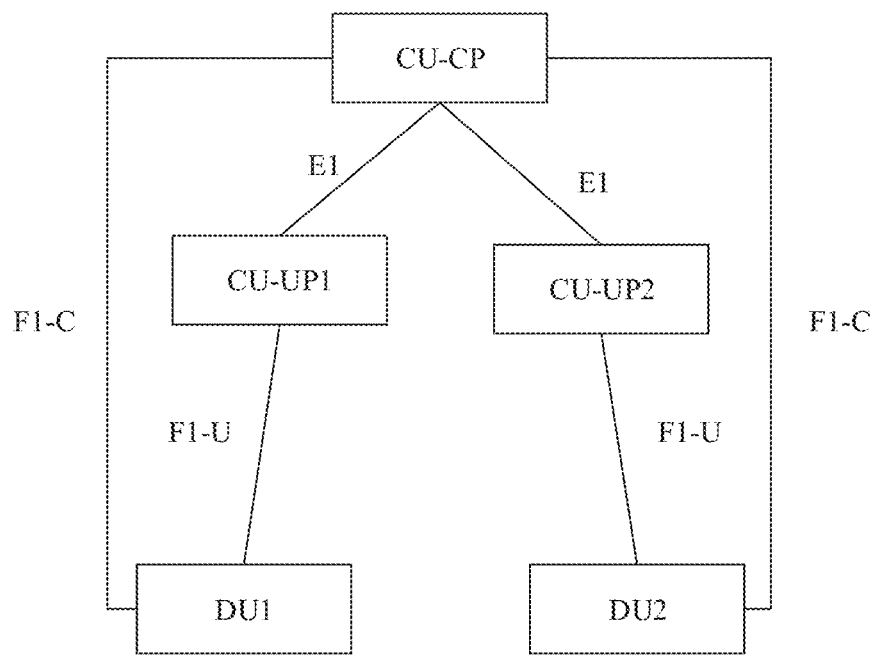
(e)
FIG. 6 (Continued from a last page)

COMMUNICATION METHOD, COMMUNICATIONS DEVICE, AND COMMUNICATIONS SYSTEM THEREOF

CROSS-REFERENCE TO RELATED APPLICATIONS

This application is a continuation of International Application No. PCT/CN2018/116059, filed on Nov. 17, 2018, which claims priority to Chinese Patent Application No. 201711148247.8, filed on Nov. 17, 2017. The disclosures of the aforementioned applications are hereby incorporated by reference in their entireties.

TECHNICAL FIELD

This application relates to the communications field, and more specifically, to a communication method, a communications device, a communications system thereof, and the like.

BACKGROUND

In a next generation mobile communications system, such as a fifth generation mobile communications (5G) system, a base station is referred to as a gNB or an ng-eNB. The ng-eNB is an evolved base station of a long term evolution (LTE) system base station (LTE eNB). FIG. 1 is a schematic block diagram of a 5G system. In the system 100, interconnection between gNBs, between ng-eNBs, or between a gNB and an ng-eNB are implemented through an Xn interface in a next generation radio access network (NG-RAN). The gNB and a 5G core network (5GC) device are interconnected through an NG interface, and the ng-eNB and the 5GC device are interconnected through an NG interface. The 5GC device may be an access and mobility management function (AMF) entity or a user plane function (UMF) entity. The AMF is mainly responsible for access management, and the UPF is mainly responsible for session management. A conventional base station usually includes logical function protocol layers such as a radio resource control (RRC) layer, a service data adaptation protocol (SDAP) layer, a packet data convergence protocol (PDCP) layer, a radio link control (RLC) layer, a media access control (MAC) layer, and a physical layer (PHY). These layers are evolved in an architecture of a next generation base station. FIG. 2 is a schematic block diagram of a 5G system. The system 200 includes a 5GC and an NG-RAN. In the NG-RAN, a base station gNB may include a centralized unit (CU) and a distributed unit (DU). A CU-DU architecture may be understood as function division of a base station in a conventional access network. Some functions of the conventional base station are deployed on the CU, and the other functions are deployed on the DU. A plurality of DUs may share one CU to save costs and facilitate network expansion, and the CU and the DU exchange information through an F1 interface.

For a dual-connectivity or a multi-connectivity scenario, to be specific, for a scenario in which a terminal device is communicatively connected to a plurality of DUs, transmission outage may occur between the terminal device and one of the DUs.

SUMMARY

This application provides a communication method, a communications device, a communications system thereof, and the like, to effectively exchange information about outage or terminal resume between a DU and a CU when radio link outage occurs between a terminal device and the DU in the background, and improve system reliability.

According to a first aspect, an embodiment of this application provides a communication method. The communication method is run in a communications system, and the communications system includes a first network node and a second network node. When the communications system is run, the first network node sends, to the second network node on each of at least one user plane tunnel, a message for feeding back a downlink transmission status. Each of the at least one message includes an indication, the indication is used to directly or indirectly indicate information about radio link outage or radio link resume between the first network node and a terminal device, and the at least one user plane tunnel is established at a communications interface between the first network node and the second network node and is associated with the terminal device. A first message of the at least one message includes information about a lost data packet, and a second message of the at least one message does not include the information about the lost data packet; each of the at least one message includes information about a lost data packet; or none of the at least one message includes information about a lost data packet. For ease of understanding only, a plurality of data radio bearers (DRB) are usually used for uplink and downlink data transmission between the terminal device and a DU. When the first network node is a DU and the second network node is a CU, a plurality of user plane data transport tunnels are correspondingly established for the plurality of DRBs of the terminal device at the communications interface (for example, an F1 interface) between the CU and the DU, and there may be a one-to-one correspondence between the DRBs and user plane tunnels. For example, in this solution, the DU may send, on the plurality of user plane tunnels, the messages for feeding back the downlink transmission status. Each of these messages includes the information about the radio link outage or radio link resume between the DU and the terminal device, all or some of these messages may carry the information about the lost data packet in a downlink transmission process, or none of these messages may include the information about the lost data packet in a downlink transmission process. In this solution, robustness of a process of feeding back the information about the radio link outage or radio link resume can be improved, thereby improving system reliability.

According to the first aspect, in a design, the at least one user plane tunnel is all user plane tunnels that are established at the communications interface between the first network node and the second network node and that are associated with the terminal device. Information about radio link outage or radio link resume between a radio access device and the terminal device is sent on all the user plane tunnels established for the terminal device. The robustness of the process of feeding back the information about the radio link outage or radio link resume can further be improved, thereby improving the system reliability.

It can be understood that in a feasible design, the first network node may carry indication information in the message that is for feeding back the downlink transmission status and that is on all the user plane tunnels established for the terminal device. The indication information is used to directly or indirectly indicate the information about the radio link outage or radio link resume between the first network node and the terminal device. That whether the message for feeding back the downlink transmission status needs to carry the information about the lost data packet in the downlink transmission process may not be considered. To be specific, the following may not be considered in this solution: Whether there is a lost data packet in a downlink transmission process between the second network node and the first network node, or whether there is downlink data transmission between the second network node and the first network node. It can be understood that, when the message for feeding back the downlink status is used to feed back the information about the radio link outage or radio link resume, whether to carry the information about the lost data packet in the message for feeding back the downlink status may be determined depending on an actual situation. To be specific, if there is data packet loss on the data radio bearers corresponding to the user plane tunnels, the message for feeding back the downlink status may carry the information about the radio link outage and also carry the information about the lost data packet. If there is no packet loss on the data radio bearers corresponding to the user plane tunnels, the message for feeding back the downlink status carries the information about the radio link outage but does not carry the information about the lost data packet. According to this design, the information about the radio link outage or radio link resume between the radio access device and the terminal device is sent on all the user plane tunnels established for the terminal device, and the downlink data transmission between the first network node and the second network node is not considered. This improves the robustness of the process of feeding back the information about the radio link outage or radio link resume, thereby improving the system reliability and simplifying a system design. This design may be further combined with the first aspect and at least one design of the first aspect in this application, to meet a requirement of a particular scenario and resolve an objective technical problem.

According to the first aspect, in a design, the first network node has at least one of the following processing functions: a full or partial radio resource control processing function, a full or partial service data adaptation protocol processing function, a full or partial packet data convergence protocol processing function, a full or partial radio link control processing function, a full or partial media access control processing function, and a full or partial physical layer processing function; and the second network node has at least one of the following processing functions: a full or partial radio resource control processing function, a full or partial service data adaptation protocol processing function, a full or partial packet data convergence protocol processing function, a full or partial radio link control processing function, a full or partial media access control processing function, and a full or partial physical layer processing function. According to this design, the first aspect and the various designs of the first aspect are applicable to an evolving and changing network architecture, so that in systems with different logical function architectures, the robustness of the process of feeding back the information about the radio link outage or radio link resume can be improved, thereby improving the system reliability.

According to the first aspect, in a design, the first network node has the radio link control processing function, the media access control processing function, and the physical layer processing function; and the second network node has the radio resource control processing function, the service data adaptation protocol processing function, and the packet data convergence protocol processing function. Herein, the first network node may be a DU, and the second network node may be a CU. For the DU and the CU that are based on functional architecture division in this design, the robustness of the process of feeding back the information about the radio link outage or radio link resume is improved.

According to the first aspect, in a design, the first network node includes a first radio access network node and a second radio access network node, and there is a communications interface between the first radio access network node and the second radio access network node, where the first radio access network node has the radio resource control processing function, the service data adaptation protocol processing function, and the packet data convergence protocol processing function; the second radio access network node has the radio link control processing function, the media access control processing function, and the physical layer processing function; the first radio access network node and the second radio access network node exchange information through the communications interface therebetween; the communications interface between the first network node and the second network node is the communications interface between the first radio access network node and the second network node; and the second radio access network node sends, to the first radio access network node, the indication used to indicate the radio link outage or radio link resume between the first network node and the terminal device, and the first radio access network node sends the indication to the second network node. For example, this design may be applied to a scenario in which UE is in dual connectivity with an eNB/ng-eNB/gNB and an eNB/ng-eNB/gNB. The eNB/ng-eNB/gNB serves as a secondary base station, and the eNB/ng-eNB/gNB has a CU-DU architecture. Herein, the first network node may be the eNB/ng-eNB/gNB, the first radio access network node may be a CU, the second radio access network node may be a DU, and the second network node may be the eNB/ng-eNB/gNB. According to this design, robustness of a process of feeding back information about radio link outage or radio link resume by the eNB/ng-eNB/gNB with the CU-DU architecture to the eNB/ng-eNB/gNB serving as a primary base station can be improved in this dual-connectivity scenario.

According to the first aspect, in a design, the second network node includes a first device and a second device, and the first device and the second device exchange information through a communications interface therebetween, where the first device has a packet data convergence protocol user plane processing function and the service data adaptation protocol processing function, and the second device has the radio resource control processing function and a packet data convergence protocol control plane processing function; or the first device has a packet data convergence protocol user plane processing function, a packet data convergence protocol control plane processing function, and the service data adaptation protocol processing function, and the second device has the radio resource control processing function; and the communications interface between the first network node and the second network node is an interface between the first device and the first network node. The first device receives, from the first network node, the indication used to indicate the radio link outage or radio link resume between the first network node and the terminal device. The first device may further forward, to the second device, information about the indication that is received by the first device and that is used to indicate the radio link outage or radio link resume between the first network node and the terminal device. For example, the second network node is a CU, the first device is a UP of the CU, and the second device is a CP of the CU. An example architecture is that the CP is deployed with the RRC function and the packet data convergence protocol control plane processing function (PDCP-C). The PDCP-C is mainly responsible for encryption and decryption, integrity protection, data transmission, and the like of control plane data. The UP is deployed with the SDAP function and the packet data convergence protocol user plane processing function (PDCP-U), and the UP is mainly responsible for user plane functions. The SDAP is mainly responsible for processing data of a core network and mapping a flow to a bearer. The PDCP-U is mainly responsible for encryption and decryption, integrity protection, header compression, sequence number maintenance, data transmission, and the like on a data plane. Another example architecture is that the CP is deployed with the RRC and the UP is deployed with the PDCP-U and the PDCP-C. According to this design, robustness of a process of feeding back information about radio link outage or radio link resume to the CU with the CP-UP architecture is improved, thereby improving system reliability.

Any one of the enumerated designs of the first aspect may be understood as a technical solution designed for a specific scenario or a specific technical problem, but may not be understood as necessary for implementing the technical content described in this application. Any one of these designs may be combined with another design for implementation as required, to more pertinently resolve a specific objective technical problem.

According to a second aspect, this application provides a communications device. The communications device includes at least one processor and a communications interface, the communications interface is used for information exchange between the communications device and another communications device, and when a program instruction is executed in the at least one processor, the communications device is enabled to implement the functions of any one of the following devices in any one of the first aspect or the designs of the first aspect: the first network node, the second network node, the first radio access network node, the second radio access network node, the first device, and the second device.

According to a third aspect, this application provides a computer program product. The computer program product has a program instruction, and when the program instruction is directly or indirectly executed, functions of any one of the following devices in any one of the first aspect or the designs of the first aspect are implemented: the first network node, the second network node, the first radio access network node, the second radio access network node, the first device, and the second device.

According to a fourth aspect, this application provides a computer program storage medium. The computer program storage medium has a program instruction, and when the program instruction is directly or indirectly executed, functions of any one of the following devices in any one of the first aspect or the designs of the first aspect are implemented: the first network node, the second network node, the first radio access network node, the second radio access network node, the first device, and the second device.

According to a fifth aspect, this application provides a chip system. The chip system includes at least one processor, and when a program instruction is executed in the at least one processor, functions of any one of the following devices in any one of the first aspect or the designs of the first aspect are implemented: the first network node, the second network node, the first radio access network node, the second radio access network node, the first device, and the second device.

According to a sixth aspect, this application provides a communications system. The communications system includes the communications device in second aspect.

BRIEF DESCRIPTION OF DRAWINGS

FIG. 5 is a schematic diagram of a system architecture according to an embodiment of this application;

FIG. 6 is a schematic diagram of a system architecture according to an embodiment of this application.

DESCRIPTION OF EMBODIMENTS

Figure 1:
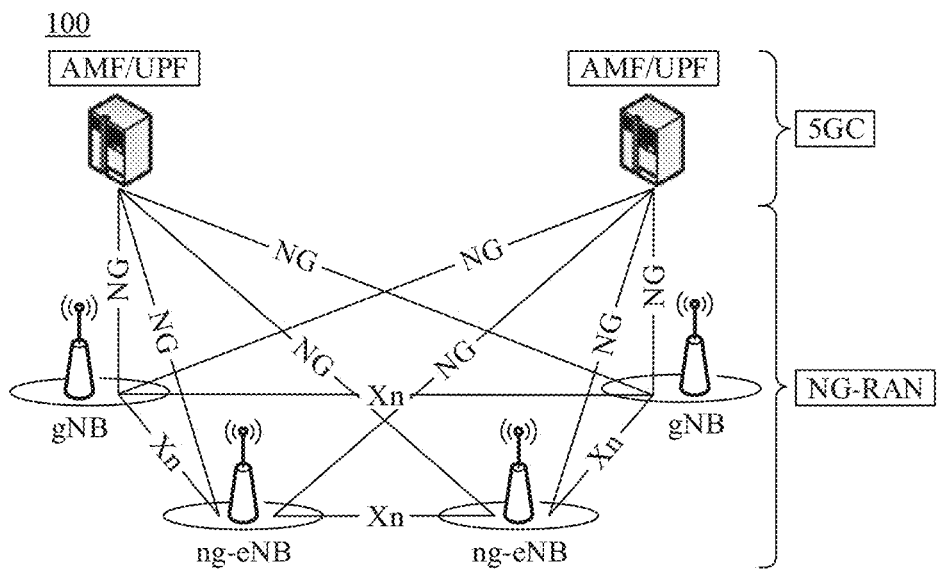
FIG. 1 is a schematic block diagram of a 5G system according to an embodiment of this application.
Figure 2:
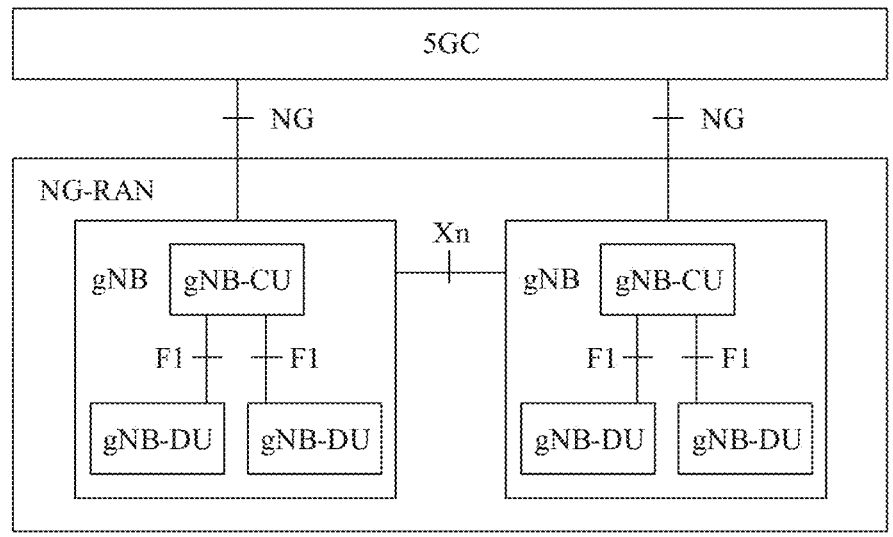
FIG. 2 is a schematic block diagram of a 5G system according to an embodiment of this application.

Common technical meanings of terms used in the embodiments of this application are described first.

Terms "first", "second", and the like in this application are merely used to distinguish between different objects, and "first" and "second" do not limit an actual order or functions of the objects modified by "first" and "second". For example, "first" and "second" in a "first network node" and a "second network node" are only used to indicate that the two nodes are different network nodes, and do not limit an actual order or functions of the two nodes. Expressions "as an example", "in an example", "for example", "an optional design", or "a design" used in this application are merely used to provide an example, illustration, or description. Any embodiment or design solution described by using "as an example", "in an example", "for example", "an optional design", or "a design" in this application should not be interpreted as being more preferred or having more advantages than another embodiment or design solution. To be specific, these terms are used to present a related concept in a specific manner. Terms "uplink" and "downlink" used in this application are used to describe a direction of data/information transmission in a specific scenario. For example, an "uplink" direction is usually a direction in which data/information is sent from a terminal device to a base station, and a "downlink" direction is usually a direction in which data/information is sent from the base station to the terminal device. It can be understood that the "uplink" and "downlink" are only used to describe the direction of data/information transmission. Neither a specific device from which data/information transmission starts nor a specific device at which data/information transmission ends is limited.

A term "and/or" in this application describes only an association relationship between associated objects and represents that three relationships may exist. For example, A and/or B may represent the following three cases: Only A exists, both A and B exist, and only B exists. Moreover, unless otherwise specified, a character "/" in this application usually indicates an "or" relationship between objects before and after the character "/". A character "-" used in this application is usually used to indicate that there is a corresponding/association/mapping/collaboration relationship between objects before and after the character. For example, "-" in an expression "packet data aggregation protocol user plane processing function (PDCP-U)" may be understood as a user plane function corresponding to a PDCP function.

Unless otherwise specified, an expression used in this application similar to an expression that "an item includes at least one of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and other combinations of A, B and C. In the foregoing, an example of three items A, B and C is used to describe optional cases of the item. When the expression is "the item includes at least one of the following: A, B, . . . , and X". In other words, there are more elements in the expression, and cases applicable to the item may also be obtained according to the foregoing rule.

Names are assigned to various objects such as various messages/information/devices/network elements/systems/apparatuses/actions/operations/processes/concepts that may be used in this application, and it can be understood that these specific names do not constitute any limitation on the related objects. The assigned names may vary with factors such as a scenario, a context, or a usage habit. Technical meanings of the technical terms in this application should be mainly understood from functions and technical effects reflected/implemented by the technical terms in the technical solutions.

In this application, a terminal device may be the following form: user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a WLAN; or may be a cellular phone, a cordless phone, a session initiation protocol (SIP) phone, a wireless local loop (WLL) station, a personal digital processing (PDA) device, a handheld device having a wireless communication function, a computing device or another processing device connected to a wireless modem, a vehicle-mounted device, a wearable device, a terminal device in a next generation communications system such as a 5G network, or a terminal device in a future evolved public land mobile network (PLMN) network, or the like. The terminal device may also be a wearable device. The wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that is directly worn on the body or integrated into clothes or an accessory of a user. The terminal device may also be a terminal device in an Internet of things (IoT) system. IoT is an important part in future development of information technologies, and has a technical feature that things are connected to a network by using communications technologies, to implement a smartened network in which human-machine interconnection and thing-thing interconnection are implemented.

The network architecture and the service scenario described in the embodiments of this application are intended to make readers understand the technical solutions in the embodiments of this application more clearly, and do not constitute any limitation on the technical solutions provided in the embodiments of this application. A person of ordinary skill in the art may know that, with evolution of a network architecture and emergence of a new service scenario, the technical solutions provided in the embodiments of this application are also applicable to similar technical problems.

The following describes the technical solutions in this application with reference to the accompanying drawings.

Figure 3:
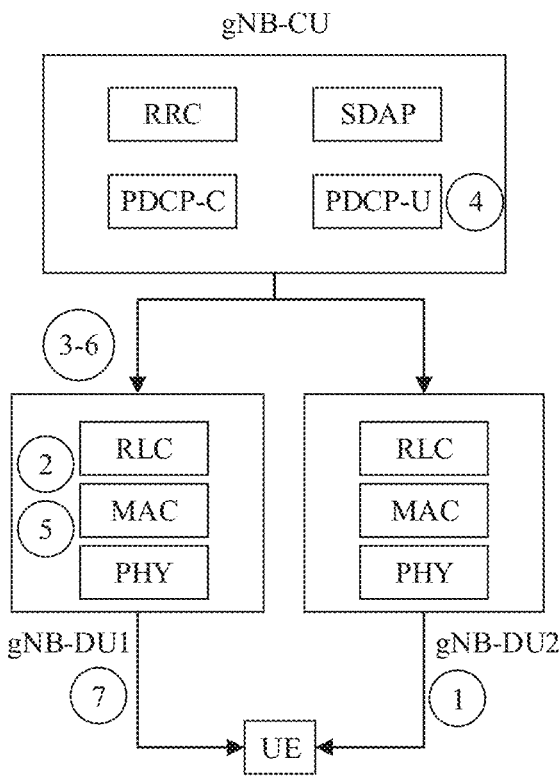
FIG. 3 is a schematic diagram of a communication method according to an embodiment of this application.

In a dual-connectivity or multi-connectivity scenario, a terminal device is communicatively connected to two or more wireless access devices. For example, the terminal device is UE and the wireless access device is a DU. When radio link outage occurs between the UE and one of the plurality of DUs to which the UE is connected, a PDCP PDU that is unsuccessfully transmitted may continue to be sent by using another DU. FIG. 3 is a schematic diagram of a communication method according to this application. As shown in FIG. 3, UE is connected to a CU of a gNB by using a DU1 and a DU2 that are of the gNB. The CU has RRC, SDAP, PDCP-C, and PDCP-U processing functions, and a DU has RLC, MAC, and PHY processing functions. The CU sends a data packet 1 to the UE by using the DU2, and the CU sends a data packet 7 to the UE by using the DU1. A data packet 2 and a data packet 5 are to be transmitted to the UE at the DU1, and a data packet 3 to a data packet 6 are transmitted at an F1 interface between the CU and the DU. When radio interference is severe, deep fading occurs on a channel, or the like, if transmission outage occurs (temporarily or for a period of time) between the DU1 and the UE, the data packet 2 to the data packet 6 that has not been transmitted to the UE may continue to be transmitted to the UE by using the DU2.

When transmission outage occurs between the DU and the UE, the DU may send an indication of a transmission fault or radio link outage to the CU through an F1-U interface between the DU and the CU. After receiving the indication of the transmission fault or the radio link outage, the CU may remove the faulty DU, and/or the CU may select another DU that is connected to the UE to continue with data transmission. When the CU does not remove the DU, after transmission resume of the DU, the DU may send an indication of transmission fault rectification or radio link resume to the CU through the F1-U interface. After receiving the indication of the transmission fault rectification or the radio link resume, the CU may determine whether to continue with data transmission at the DU.

One corresponding user plane tunnel may be established for each data radio bearer DRB of the UE at the F1-U interface between the CU and the DU. An F1-U tunnel of a DRB level may be used to transmit user data and a downlink transmission status downlink data delivery status, DDDS) report. It can be understood that the DDDS is also of a DRB level. In other words, there is a corresponding DDDS report for each DRB corresponding to the UE. Currently, an example of the DDDS report is shown in Table 1.

TABLE 1

| Bits | | | | | | | Quantity of bytes |
|---|---|---|---|---|---|---|---|
| 7 | 6 | 5 | 4 | 3 | 2 | 1 | 0 | |
| PDU Type (=1) Protocol data unit type (=1) | | Spare Spare | Cause Report Cause report | Final Frame Ind. Final frame indication | Lost Packet Report Lost packet report | 1 |
| Highest successfully delivered PDCP sequence number Highest successfully delivered PDCP Sequence Number | | | | | | | 3 |
| Desired buffer size for the data radio bearer Desired buffer size for the data radio bearer | | | | | | | 4 |
| Minimum desired buffer size for the UE Minimum desired buffer size for the UE | | | | | | | 4 |
| Quantity of lost F1-U sequence number ranges reported Number of lost F1-U Sequence Number ranges reported | | | | | | | 1 |
| Start location of a lost F1-U sequence number range Start of lost F1-U Sequence Number range | | | | | | | 4 × (Number of lost F1-U SN ranges reported) |
| End location of the lost F1-U sequence number range End of lost F1-U Sequence Number range | | | | | | | 4 × (Number of reported lost F1-U SN ranges) |
| Cause value Cause Value | | | | | | | 1 |
| Spare extension Spare extension | | | | | | | 0-4 |

In the example of the DDDS, content of the DDDS mainly includes information such as a data packet sending status, a data packet losing status, and a data buffering status. When the cause report is 0, it indicates that the DDDS does not carry a cause value. When the cause report is 1, it indicates that the DDDS carries a cause value. When a value of the lost packet report is 0, it indicates that the DDDS does not carry a lost data packet status. To be specific, the DDDS does not carry the following specific information: the quantity of lost F1-U sequence number ranges reported, the start location of the lost F1-U sequence number range, and the end location of the lost F1-U sequence number range. When a value of the lost packet report Lost Packet Report is 1, it indicates that the DDDS carries a lost data packet status. To be specific, the DDDS carries the following specific information: the quantity of lost F1-U sequence number ranges reported, the start location of the lost F1-U sequence number range, and the end location of the lost F1-U sequence number range. The DU may indicate the radio link outage and the radio link resume by using the cause value in the DDDS report. For example, when the cause value is 1, it indicates that the radio link outage occurs. When the cause value is 2, it indicates that the radio link resume occurs. It can be understood that another cause value may also be used to indicate the radio link outage or the radio link resume.

Currently, there is no mechanism for resolving how to transmit the foregoing indication information of the transmission fault or the radio link outage, and/or indication information of the transmission resume or the radio link resume in the DDDS corresponding to each DRB. In addition, if there is no data exchange on a DRB of the UE during an outage period of the DU1, the DDDS does not need to be transmitted on an F1-U tunnel corresponding to the DRB. For another example, if there is no packet loss on a DRB of the UE, the DDDS sent on an F1-U tunnel corresponding to the DRB does not need to include the lost data packet status neither.

For a CU-DU architecture that is expanded into an LTE system, similar problems also exist in a communication scenario in which the UE is in dual connectivity or multi-connectivity with LTE DUs. To be specific, when a V1 interface user plane tunnel between an LTE CU and the LTE DU is also of a DRB level, if the LTE DU needs to send the indication information of the radio link outage and/or radio link resume to the LTE CU, the foregoing problems also need to be considered.

In addition, similar problems also exist in a communication scenario (EN-DC) of dual connectivity between the UE and an LTE eNB and a new radio (NR) gNB, an NR-DC scenario of dual connectivity between the UE and an NR gNB and an NR gNB, a scenario of dual connectivity between the UE and an NR gNB and an LTE eNB/ng-eNB, and a scenario of dual connectivity between the UE and an LTE eNB and an LIE eNB. To be specific, the following problem needs to be resolved at an X2-U interface and an Xn-U interface, for example, how to transmit the indication information of the radio link outage and/or radio link resume to a primary base station when a link between a secondary base station and the UE is faulty.

Figure 4:
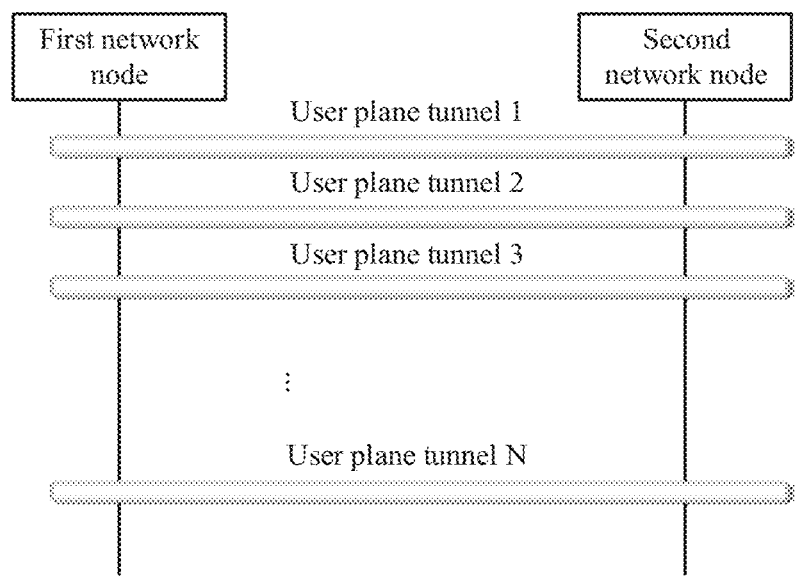
FIG. 4 is a schematic diagram of a communication method according to an embodiment of this application.

In view of the foregoing analysis of the plurality of specific scenarios, as shown in FIG. 4, an embodiment of this application proposes a communication method 400 to provide a mechanism to make information about radio link outage and/or radio link resume be reliably and effectively transmitted to a control node, so as to improve system reliability.

The method 400 is run in a corresponding communications system 400. As shown in FIG. 4, the communications system 400 includes a first network node and a second network node. When the communications system is run, the first network node sends, to the second network node on each of at least one user plane tunnel, a message for feeding back a downlink transmission status. A quantity of user plane tunnels may depend on a quantity of DRBs established between the first network node and the second network node for a terminal device. There may be N user plane tunnels shown in the communications system 400, where a value of N may be a positive integer, and a specific value is not limited herein. Each of the at least one message includes information used to directly or indirectly indicate radio link outage or radio link resume between the first network node and the terminal device. The at least one user plane tunnel is established at a communications interface between the first network node and the second network node and is associated with the terminal device. One of the at least one message may include information about a lost data packet, or one of the at least one message does not include information about a lost data packet; or each of the at least one message includes information about a lost data packet; or none of the at least one message includes information about a lost data packet. For example, in this solution, a DU may send, on the plurality of user plane tunnels, the messages for feeding back the downlink transmission status. Each of these messages includes information about the radio link outage or radio link resume between the DU and the terminal device, all or some of these messages may carry the information about the lost data packet in a downlink transmission process, or none of these messages may include the information about the lost data packet in a downlink transmission process. Whether to carry the information about the lost data packet may be specifically determined depending on an actual situation. In this solution, robustness of a process of feeding back the information about the radio link outage or radio link resume can be improved, thereby improving system reliability.

In a possible design, the user plane tunnels used to send the information about the radio link outage or radio link resume may be some or all of the user plane tunnels established for the terminal device. For example, any one of all the user plane tunnels established between the first network node and the second network node for the UE is selected, for example, a user plane tunnel corresponding to a maximum DRB ID, a minimum DRB ID, or the first or last DRB in a DRB list is selected. When the at least one user plane tunnel is all the user plane tunnels that are established at the communications interface between the first network node and the second network node and that are associated with the terminal device, the robustness of the process of feeding back the information about the radio link outage or radio link resume can be further improved, thereby improving system reliability. It should be noted that the N user plane tunnels shown in FIG. 4 may be some or all of the user plane tunnels established for the terminal device.

In an optional design, the user plane tunnels used to send the information about the radio link outage or radio link resume may be all user plane tunnels corresponding to data radio bearers on which packet loss occurs. In other words, when the information about the radio link outage is sent on the user plane tunnels, a lost data packet status is also sent. In this design, if there is no packet loss on a corresponding data radio bearer, the information about the radio link outage does not need to be sent on the user plane tunnel. When the radio link resume occurs, the first network node sends the information about the radio link resume on each user plane tunnel on which the radio link outage was sent, or may select one user plane tunnel from all the user plane tunnels on which the radio link outage was sent to send the information about the radio link resume.

It can be understood that the first network node may add indication information to the message that is for feeding back the downlink transmission status and that is in each of all the user plane tunnels established for the terminal device, to directly or indirectly indicate the information about the radio link outage or radio link resume between the first network node and the terminal device. The following may not be considered: Whether the message for feeding back the downlink transmission status needs to carry the information about the lost data packet in the downlink transmission process, whether there is a lost data packet in a downlink transmission process between the second network node and the first network node, or whether there is downlink data transmission between the second network node and the first network node. It can be understood that, when the message for feeding back the downlink status is used to feed back the information about the radio link outage or radio link resume, whether to carry the information about the lost data packet in the message for feeding back the downlink status may be determined depending on an actual situation. To be specific, if there is data packet loss on the data radio bearers corresponding to the user plane tunnels, the message for feeding back the downlink status may carry the information about the radio link outage and also carry the information about the lost data packet. If there is no packet loss on the data radio bearers corresponding to the user plane tunnels, the message for feeding back the downlink status carries the information about the radio link outage but does not carry the information about the lost data packet. Information used to indicate radio link outage or radio link resume between a radio access device and the terminal device is sent on all the user plane tunnels established for the terminal device, and downlink data transmission between the first network node and the second network node is not considered. This can improve the robustness of the process of feeding back the information about the radio link outage or radio link resume, thereby improving the system reliability and simplifying a system design. This design may be further combined with another design to meet a requirement of a specific scenario and resolve an objective technical problem. For example, first, it is designed that the message that is for feeding back the downlink transmission status and that is on each of all the user plane tunnels established for the terminal device carries the information about the radio link outage or radio link resume between the first network node and the terminal device. Then, the following is further designed: which messages of the messages for feeding back the downlink transmission status need to carry the information about the lost data packet in the downlink transmission; none of these messages needs to carry the information about the lost data packet in the downlink transmission; or all of these messages need to carry the information about the lost data packet in the downlink transmission.

In an optional design, the first network node has at least one of the following processing functions: a full or partial radio resource control processing function, a full or partial service data adaptation protocol processing function, a full or partial packet data convergence protocol processing function, a full or partial radio link control processing function, a full or partial media access control processing function, and a full or partial physical layer processing function; and the second network node has at least one of the following processing functions: a full or partial radio resource control processing function, a full or partial service data adaptation protocol processing function, a full or partial packet data convergence protocol processing function, a full or partial radio link control processing function, a full or partial media access control processing function, and a full or partial physical layer processing function. According to this design, the method 400 is applicable to various evolving or changing network architectures, so that robustness of a process of feeding back information about radio link outage or radio link resume can be improved in systems with different logical function architectures, thereby improving system reliability.

Referring to the foregoing design, in an optional design, the first network node has the radio link control processing function, the media access control processing function, and the physical layer processing function; and the second network node has the radio resource control processing function, the service data adaptation protocol processing function, and the packet data convergence protocol processing function. Herein, the first network node may be a DU, and the second network node may be a CU. For the DU and the CU that are based on functional architecture division in this design, the robustness of the process of feeding back the information about the radio link outage or radio link resume is improved.

In an optional design, the second network node includes a first device and a second device, and the first device and the second device exchange information through a communications interface therebetween. In this case, the communications interface between the first network node and the second network node is an interface between the first network node and the first device. The first device receives, from the first network node, an indication used to indicate the radio link outage or radio link resume between the first network node and the terminal device. The first device may further forward, to the second device, information about the indication that is received by the first device and that is used to indicate the radio link outage or radio link resume between the first network node and the terminal device. For a specific implementation architecture of the second network node, refer to a system architecture 500 provided in an embodiment of this application in FIG. 5. The second network node may be a CU, the first device may be a user plane (UP) entity of the CU, the second device may be a control plane (CP) entity of the CU, and a communications interface between the UP and the CP may be an E1 interface. Referring to FIG. 5(a), the first device has a packet data convergence protocol user plane (PDCP-U) processing function and a service data adaptation protocol (SDAP) processing function, and the second device has a radio resource control (RRC) processing function and a packet data convergence protocol control plane (PDCP-C) processing function. Optionally, another implementation architecture is shown in FIG. 5(b). The first device has a packet data convergence protocol user plane (PDCP-U) processing function, a packet data convergence protocol control plane (PDCP-C) processing function, and a service data adaptation protocol (SDAP) processing function, and the second device has a radio resource control (RRC) processing function.

Specifically, when the first network node is a DU, the first device is a user plane entity of a CU (CU-UP), and the second device is a control plane entity of the CU (CU-CP). For a networking architecture used to execute a procedure in this embodiment, refer to a system architecture provided in an embodiment in FIG. 6. FIG. 6(a) to FIG. 6(e) show different networking architectures. These networking architectures share the following similarities: A central control node CU includes a CU-CP and a CU-UP, the CU-CP and the CU-UP are connected through an E1 interface, the CU is in dual connectivity or multi-connectivity with a plurality of DUs, a logical interface between the CU and a DU is referred to as F1, the DU and the CU-CP are connected through an F1 interface control plane (F1-C), and the DU and the CU-UP are connected through an F1 interface user plane (F1-U). In actual deployment, the CU-CP and the CU-UP may be separately deployed (as shown in FIG. 6(a) to FIG. 6(e)), the CU-CP and the CU-UP may be deployed together, the DU and the CU-CP may be deployed together (as shown in FIG. 6(b)), or the DU and the CU-UP may be deployed together. Under management of the CU-CP, one DU may be connected to a plurality of UPs, or one CU-UP may be connected to a plurality of DUs (as shown in FIG. 6(d)). Therefore, in a dual-connectivity or multi-connectivity case, different DUs may be connected to different CU-UPs (as shown in FIG. 6(e)). For example, UE is connected to both a DU1 and a DU2, and the DU1 and the DU2 may be connected to a same CU-UP (as shown in FIG. 6(d)) or different CU-UPs (as shown in FIG. 6(e)). It can be understood that units described as separate parts in the figure may or may not be physically separate. Parts displayed as units may or may not be physical units, and may be located in one location, or may be distributed on a plurality of network units. Some or all of the units may be selected based on actual requirements to achieve the objectives of the solutions in the embodiments.

Based on the foregoing networking architecture, an example design proposed in this embodiment of this application based on the CP-UP split architecture includes the following steps.

Step 1: The DU1 may notify the CU-UP in the following four manners when the DU1 finds that temporary transmission outage occurs on connected UE.

Manner 1: Send a DDDS PDU including an indication about radio link outage on all F1-U tunnels that are established between the CU-UP and the DU and that are of the UE. When packet loss occurs during transmission that is on the DU1 and that is of a DRB corresponding to an F1-U tunnel (the packet loss herein includes air interface packet loss, namely, packet loss between the DU and the UE, and F1 interface packet loss), the DDDS PDU may further carry packet loss information. To be specific, DDDSs sent on some F1-U tunnels may include only an outage indication, but DDDSs sent on other F1-U tunnels include both an outage indication and packet loss information.

Manner 2: Send a DDDS PDU including an outage indication on all F1-U tunnels that are established between the CU-UP and the DU and on which packet loss occurs on all DRBs corresponding to the UE. In this case, all DDDS PDUs in which the outage indication is sent include packet loss information.

Manner 3: Select any one of F1-U tunnels on which packet loss occurs, and the F1-U tunnels are established between the CU-UP and the DU and that are of the UE, for example, an F1-U tunnel corresponding to a maximum DRB ID, a minimum DRB ID, or the first or last DRB in a DRB list. A DDDS PDU transmitted on the selected F1-U tunnel includes an outage indication. In this solution, a DDDS PDU transmitted on one F1-U on which packet loss occurs may include both an outage indication and packet loss information. A DDDS PDU transmitted on another F1-U on which packet loss occurs may include only packet loss information.

Manner 4: Select any one of all F1-U tunnels that are established between the CU-UP and the DU and that are of the UE, for example, an F1-U tunnel corresponding to a maximum DRB ID, a minimum DRB ID, or the first or last DRB in a DRB list. A DDDS PDU transmitted on the selected F1-U tunnel includes an outage indication. In this solution, the DDDS PDU including the outage indication may or may not carry packet loss information. A DDDS PDU transmitted on another F1-U on which packet loss occurs may include only packet loss information.

Step 2: After receiving the outage indication, the CU-UP stops data transmission with the DU1. A data packet that is unsuccessfully transmitted on the DU1 continues to be transmitted on another connected DU. The CU-UP notifies the CU-CP through the E1 interface that outage occurs on air interface transmission between the DU1 and the UE. After receiving the notification, the CU-CP stops sending an RRC message to the UE by using the DU1. Particularly, the CU-CP may notify the CU-UP that the packet unsuccessfully transmitted on the DU1 continues to be transmitted by using which DU.

Step 3: When finding that transmission resume occurs, the DU1 notifies the CU-UP by using a DDDS including a resume indication. According to the four previously selected methods, a DDDS PDU including the resume indication is sent on the F1-U tunnel including the outage indication. Similarly, after receiving the resume indication, the CU-UP notifies the CU-CP through the E1 interface that air interface resume occurs between the DU1 and the UE. The CU-CP may send the RRC message to the DU by using the DU1 thereafter.

It can be understood that a mechanism for feeding back the information about the radio link outage or radio link resume under a CP-UP split architecture is applicable to a CP-UP division scenario in an LTE system, or is applicable to a CP-UP split scenario in 5G NR.

According to this design, robustness of a process of feeding back information about the radio link outage or radio link resume by the DU to the CU with the CP-UP architecture is improved, thereby improving system reliability.

In an optional design, the first network node includes a first radio access network node and a second radio access network node, and there is a communications interface between the first radio access network node and the second radio access network node, where the first radio access network node has the radio resource control processing function, the service data adaptation protocol processing function, and the packet data convergence protocol processing function; the second radio access network node has the radio link control processing function, the media access control processing function, and the physical layer processing function; the first radio access network node and the second radio access network node exchange information through the communications interface therebetween; the communications interface between the first network node and the second network node is the communications interface between the first radio access network node and the second network node; and the second radio access network node sends, to the first radio access network node, an indication used to indicate the radio link outage or radio link resume between the first network node and the terminal device, and the first radio access network node sends the indication to the second network node. For example, this design may be applied to a scenario in which UE is in dual connectivity with an eNB/ng-eNB/gNB and an eNB/ng-eNB/gNB. The eNB/ng-eNB/gNB serves as a secondary base station, and the eNB/ng-eNB/gNB has a CU-DU architecture. Herein, the first network node may be the eNB/ng-eNB/gNB, the first radio access network node may be a CU, the second radio access network node may be a DU, and the second network node may be the eNB/ng-eNB/gNB. According to this design, robustness of a process of feeding back information about radio link outage or radio link resume by the eNB/ng-eNB/gNB with the CU-DU architecture to the eNB/ng-eNB/gNB serving as a primary base station can be improved in this dual-connectivity scenario. In an optional design, the second radio access network node DU sends the indication of the radio link outage or radio link resume to the first radio access network node CU in various feasible designs provided in this embodiment of this application, and the first radio access network node CU sends the indication of the radio link outage or radio link resume to the second network node. For example, the indication of the radio link outage or radio link resume may be transmitted by using a logical interface user plane between the first radio access network node and the second network node. Considering that there is a one-to-one correspondence between a user plane tunnel that is established by the first radio access network node and the second radio access network node for the UE and a user plane tunnel that is established by the first radio access network node and the second network node for the UE, it is assumed that the user plane tunnels established by the foregoing nodes include user plane tunnels corresponding to a DRB1, a DRB2, and a DRB3 of the UE. In a possible manner, if the first radio access network node receives the indication of the radio link failure or radio link resume on a user plane tunnel corresponding to a specific DRB of the second radio access network node, the first radio access network node sends the indication of the radio link failure or radio link resume to the second network node on a user plane tunnel that is corresponding to the DRB and that is between the first radio access network node and the second network node. When the radio link failure is fed back, a message that is for feeding back a downlink transmission status and that is sent by a second radio access network to the first radio access network node may carry a lost data packet status. Correspondingly, the message that is for feeding back the downlink transmission state and that is sent by the first radio access network node to the second network node may also carry the lost data packet status. In another possible case, the first radio access network node sends the indication of the radio link failure or radio link resume by using a logical interface control plane between the first radio access network node and the second network node. When sending the information about the radio link failure or resume, the first radio access network node may also add a user tunnel identifier and/or corresponding packet loss information, or may separately send a user tunnel identifier and/or corresponding packet loss information. The user tunnel identifier may be a DRB identifier or has a correspondence with a DRB identifier.

In an optional design, the second network node includes a first device and a second device, and the first device and the second device exchange information through a communications interface therebetween, where the first device has a packet data convergence protocol user plane processing function and the service data adaptation protocol processing function, and the second device has the radio resource control processing function and a packet data convergence protocol control plane processing function; or the first device has a packet data convergence protocol user plane processing function, a packet data convergence protocol control plane processing function, and the service data adaptation protocol processing function, and the second device has the radio resource control processing function; and the communications interface between the first network node and the second network node is an interface between the first device and the first network node. The first device receives, from the first network node, an indication used to indicate the radio link outage or radio link resume between the first network node and the terminal device. The first device may further forward, to the second device, information about the indication that is received by the first device and that is used to indicate the radio link outage or radio link resume between the first network node and the terminal device. For example, the second network node is a CU, the first device is a UP of the CU, and the second device is a CP of the CU. An example architecture is that the CP is deployed with the RRC function and the packet data convergence protocol control plane processing function (PDCP-C). The PDCP-C is mainly responsible for encryption and decryption, integrity protection, data transmission, and the like of control plane data. The UP is deployed with the SDAP function and the packet data convergence protocol user plane processing function (PDCP-U). The UP is mainly responsible for user plane functions. The SDAP is mainly responsible for processing data of a core network and mapping a flow to a bearer. The PDCP-U is mainly responsible for encryption and decryption, integrity protection, header compression, sequence number maintenance, data transmission, and the like on a data plane. Another example architecture is that the CP is deployed with the RRC and the UP is deployed with the PDCP-U and the PDCP-C. According to this design, robustness of a process of feeding back information about radio link outage or radio link resume to the CU with the CP-UP architecture is improved, thereby improving system reliability.

Any one of the enumerated designs may be understood as a technical solution designed for a specific scenario or a specific technical problem, but may not be understood as necessary for implementing the technical content described in this application. Any one of these designs may be combined with another design for implementation as required, to more pertinently resolve a specific objective technical problem.

Figure 7:
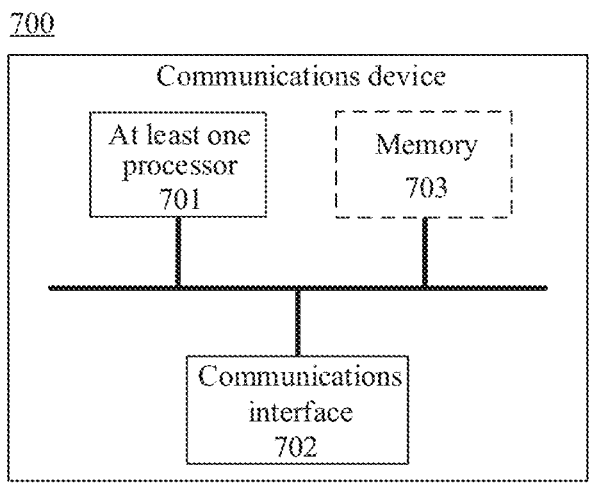
FIG. 7 is a schematic block diagram of a communications device according to an embodiment of this application.

It can be understood that for the first network node, the second network node, the first radio access network node, the second radio access network node, the first device, and the second device in the foregoing embodiments, functions of each node or device in each design in the foregoing embodiments of this application may be implemented by executing a program instruction by a hardware platform having a processor and a communications interface. Based on this, as shown in FIG. 7, an embodiment of this application provides a schematic block diagram of a communications device 700. The communications device 700 includes:

at least one processor 701 and a communications interface 702, where the communications interface is configured to support communication interaction between the communications device 700 and another device, and when a program instruction is executed in the at least one processor 701, functions of any one of the following devices in any design of the foregoing embodiments of this application are implemented: the first network node, the second network node, the first radio access network node, the second radio access network node, the first device, and the second device. Optionally, the communications device 700 may further include a memory 703 to store program instructions necessary for implementation of the functions of the devices or data generated during a program execution process. Optionally, the communications device 700 may further include an internal interconnection line, to implement communication interaction between the at least one processor 701, the communications interface, and the memory. A dedicated processing chip, a processing circuit, a processor, or a general purpose chip may be considered to implement the at least one processor 701. For example, all or a part of processing of a PHY function of a DU in this embodiment, or all or a part of a protocol communication function of an F1 interface or an E1 interface may be implemented by disposing a dedicated circuit/chip in the at least one processor, or by executing a program instruction related to a PHY function, or a communication function of an F1 interface or an E1 interface by a general purpose processor disposed in the at least one processor 701. For another example, all or a part of processing of related functions of a MAC layer, an RLC layer, a PDCP layer, an SDAP layer, and an RRC layer of a device in this embodiment of this application may be implemented by invoking program instructions related to the functions of the MAC layer, the RLC layer, the PDCP layer, the SDAP layer, and the RRC layer by a communications processing chip of the at least one processor 701. It can be understood that the methods and the procedural steps of designs described with reference to the embodiments disclosed in this specification can be implemented by electronic hardware or a combination of computer software and electronic hardware. Whether these functions are executed by hardware or software depends on specific applications and design constraints of the technical solutions. For example, program instructions may be used for implementation if generality, low costs, software and hardware decoupling, and the like are considered. For another example, dedicated circuits may be used for implementation if system performance, reliability, and the like are considered. A person of ordinary skill may implement the described functions by using different methods for each specific application. This is not limited herein.

The communications interface 702 usually has a function of performing information exchange between two communication peer ends. When the communication peer ends exchange information wiredly, the communications interface may be designed as an interface circuit or a hardware module including the interface circuit, to support the wired communication interaction between the communication peer ends. For example, this interface design may be used for the F1 interface between the DU and a CU and the E1 interface between a CP and a UP in this application. When the communication peer ends exchange information wirelessly, the communications interface may be an interface circuit with a radio frequency transceiver function or a hardware system including the interface circuit with a radio frequency transceiver function. For example, this design may be used for a communications interface between the DU and UE when wireless communication is performed between the DU and the UE.

Optionally, for implementation of the CU, the CP, or the UP, functions of the CU, the CP, or the UP in designs of this embodiment of this application may also be implemented by directly or indirectly executing program instructions of related designs in this embodiment by a universal hardware platform (with processing resources and storage resources). An actual deployment mode may be as follows: The CU, the CP, or the UP may be deployed near or onto a core network device and may be physically separated or integrated; or the functions of the CU, the CP, or the UP may be a part of a core network device.

An embodiment of this application further provides a computer program product. The computer program product has a program instruction, and when the program instruction is directly or indirectly executed, for example, when the program instruction is executed in the communications device 700 in the foregoing embodiments, functions of any one of the following devices in any design in this embodiment of this application are implemented: the first network node, the second network node, the first radio access network node, the second radio access network node, the first device, and the second device. It can be understood that the program instruction may be stored in a computer-readable storage medium or may be transmitted from a computer-readable storage medium to another computer-readable storage medium. For example, the program instruction may be transmitted from a website, computer, server, or data center to another website, computer, server, or data center in a wired (for example, a coaxial optical cable, an optical fiber, or a digital subscriber line) or wireless (for example, infrared, radio, or microwave) manner. When the program instruction is executed, considering that a specific network device generally includes a hardware layer, an operating system layer running on the hardware layer, and/or an intermediate layer, when a program instruction related to this embodiment of this application is executed, the program instruction is usually invoked and executed by a plurality of pieces of software. Therefore, the program instruction in a hardware device (a general purpose processing circuit or a dedicated processing circuit) may be an indirect execution process.

An embodiment of this application further provides a computer program storage medium. The computer program storage medium has a program instruction, and when the program instruction is directly or indirectly executed, for example, when the program instruction is executed in the communications device 700 in the foregoing embodiments, functions of any one of the following devices in, for example, any one of the first aspect or the designs of the first aspect are implemented: the first network node, the second network node, the first radio access network node, the second radio access network node, the first device, and the second device. It can be understood that, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium may be any usable medium accessible by a computer device, or a data storage device, such as a server or a data center, integrating one or more usable media. The usable medium may be a magnetic medium (for example, a floppy disk, a hard disk, or a magnetic tape), an optical medium, or a semiconductor medium (for example, a solid-state drive SSD), or the like.

An embodiment of this application further provides a chip system. The chip system includes at least one processor, and when a program instruction is executed in the at least one processor, functions of any one of the following devices in any one of the first aspect or the designs of the first aspect are implemented: the first network node, the second network node, the first radio access network node, the second radio access network node, the first device, and the second device.

An embodiment of this application further provides a communication method in a second aspect. The communication method may be applied to a scenario related to a mechanism for feeding back a radio link fault (such as outage) or radio link resume.

Example Method 1

A terminal device finds a radio link fault and reports information about the link fault to a network side device.

In this example, for example, the terminal device is UE, the radio link fault is outage, and a networking architecture on a network side is a CU-DU architecture.

The UE is communicatively connected to two or more DUs: a DU1, a DU2, . . . , and a DUn, where n is a positive integer greater than or equal to 2. The UE is connected to a CU by using the two or more DUs. There is neither primary DU nor secondary DU between the two or more DUs. For example, there is neither primary DU nor secondary DU, or there is neither primary cell nor secondary cell. The plurality of DUs communicatively connected to the UE herein may be understood as communication transmission channels between the UE and the CU.

This example mainly includes the following steps. The UE may first establish an RRC connection to the CU by accessing a cell 1 of the DU1. The CU sends a measurement configuration to the UE by using the cell 1 of the DU1, and the UE reports a measurement result. Based on the measurement result reported by the UE, the CU determines to add a cell 2 of the DU2 for the UE. The CU sends, to the DU2, a request message for UE context setup (for example, a UE context setup request), where the message includes at least one of a signaling radio bearer SRB expected to be established for the UE, a data radio bearer DRB list, an air interface capability of the UE, and identifier information of the cell 2, and the DRB list includes at least one of a DRB ID, a DRB-flow correspondence (for example, including a QoS flow ID), QoS information at a DRB granularity, and QoS information at a QoS flow granularity. The DU2 sends, to the CU, a message for feeding back UE context setup (for example, a UE context setup response), where the message may include at least one configuration of an RLC layer, a MAC layer, and a PHY layer that are configured by the DU2 for each of the SRB and the DRB of the UE. Optionally, the message may further include a UE identifier allocated to the UE, for example, a C-RNTI, and random access related information such as a dedicated preamble or a random access resource. The CU instructs, by using an RRC message, the UE to add the cell 2 of the DU2 as a serving cell, where an RRC notification message includes at least one information of a UE identity fed back by the DU, the random access related information, and a cell identity of the cell 2. After the UE successfully accesses the cell 2 of the DU2, the CU assembles, into an RRC reconfiguration message, the at least one configuration of the RLC layer, the MAC layer, and the PHY layer that are fed back by the DU2 and an SDAP layer configuration and/or a PDCP layer configuration that are/is generated by the CU, and sends the RRC reconfiguration message to the UE, where the RRC reconfiguration message includes information about the cell 2 of the DU2. Optionally, the RRC reconfiguration message may further include a configuration of a corresponding SRB and/or DRB at least one layer of the RLC layer, the MAC layer, and the PHY layer. Optionally, in the RRC reconfiguration message, the cell 1 of the DU1 and the cell 2 of the DU2 are in an equal status. To be specific, there is no difference between the PCell and the SCell or between a PSCell and the SCell in the RRC message. Specifically, the example method includes the following steps.

Step 1: The UE Finds Outage

When the UE finds that a downlink reference signal strength of a DU is less than a specific threshold and/or that a downlink reference signal strength of a DU is less than a specific threshold exceeds a specific time, for example, the UE detects that a CRS/CSI-RS/DMRS/PTRS/TRS of a serving cell of the DU1 connected to the UE or an RSRP/RSRQ corresponding to the serving cell of the DU1 connected to the UE is less than a threshold T1, and/or duration time is greater than a threshold T2, it is considered that radio link outage occurs between the UE and the DU1.

Optionally, the UE sends an outage indication to the CU over an uplink of other available DUs. For example, the LTE may select one or more DUs from the other available DUs to send an uplink RRC message to notify the CU. A specific notification method may be at least one of the following.

A. The uplink RRC message includes cell identity information and/or the outage indication. The cell identity information may be at least one of a physical cell identity (PCI), an E-UTRAN cell global identity (ECGI), and a new radio cell global identity (NR CGI), or a cell identity agreed on between the CU and the DU or the like. The CU and the DU can find a matched PCI/ECGI/NR CGI based on the agreed cell identity.

B. The RRC message may also include a cell identity, a measurement report, a measurement identifier, and the like; or the cell identity, the measurement report, the measurement identifier, and the like may be included in another uplink message. The radio link outage may be defined as a measurement X event. There is a correspondence between a measurement event and the measurement identifier, and the measurement configuration sent by the CU to the UE may include the correspondence between the measurement event and the measurement identifier. In a manner, the measurement report includes the cell identity information and/or a measurement result. The measurement result may include a measurement result of the serving cell of the DU1, and may further include a measurement result of another cell. The CU receives the measurement report and determines, based on the measurement result, whether a specific measurement event is satisfied. For example, the CU may learn, based on the measurement report, that radio link outage occurs between the UE and the serving cell of the DU1. In another manner, the measurement report includes, for example, the cell identity and/or the measurement event. The CU may directly learn, by receiving the measurement report, that the radio link outage occurs between the UE and the serving cell of the DU1. For another example, in a manner, the measurement report includes at least one of the cell identity, a measurement result, and the measurement identifier. The CU receives the measurement report and may directly learn that radio link occurs between the UE and the serving cell of the DU1, and may further learn a radio link condition between the UE and another cell. In this way, it can be determined which cell is subsequently used to transmit data that is unsuccessfully sent or received in the serving cell of the DU1.

Optionally, in addition to the outage indication, the UE may further report a PDCP status report. The report may include a first missing sequence number FMS (first missing SN) of a lost PDCP, a bitmap of a packet loss information, and the like, for example, a bitmap indicating whether all data packets between the first lost packet and the last received packet exist. For example, if all PDCP PDUs before a PDCP SN 100 are successfully received, and a PDCP PDU of a PDCP SN 102 and a PDCP PDU of a PDCP SN 105 are also received, an FMS is 101, and a bitmap may be 1001. The first digit in the bitmap may be used to represent the first digit after the FMS, namely, 102.1 indicates successful reception, 0s in the bitmap 1001 represent that PDCP PDUs of PDCP SNs 103 and 104 are unsuccessfully received, and the last digit 1 in the bitmap 1001 indicates that the PDCP PDU of the PDCP SN 105 is successfully received. The PDCP status report may be proactively sent by the UE, or the CU requests the UE to send the PDCP status report after receiving the outage indication.

Optionally, the UE may stop data transmission with the DU1 when reporting the foregoing related states. Optionally, the UE reserves at least one configuration of RLC, MAC, or PHY related to the DU1. Optionally, the UE may delete an intermediate variable transmitted with the DU1, for example, at least one of sequence information of a data unit that does not receive feedback information that is sent, a data transmission timer, time information of a hybrid automatic repeat request HARQ process, data unit transmission acknowledgment information of the HARQ process, acknowledgment information of a data unit, a maximum sending state variable, a maximum receiving state variable, a sending state variable, a receiving state variable, and a transmission window. Optionally, the UE may reserve an intermediate variable transmitted with the DU1, for example, at least one of sequence information of a data unit that does not receive feedback information that is sent, a data transmission timer, time information of a hybrid automatic repeat request HARQ process, data unit transmission acknowledgment information of the HARQ process, acknowledgment information of a data unit, a maximum sending state variable, a maximum receiving state variable, a sending state variable, a receiving state variable, and a transmission window.

When the UE finds that radio link outage occurs between the UE and all DUs, the UE initiates an RRC reestablishment procedure.

Example Method 2

UE Finds and Reports Resume

The UE detects a downlink reference signal of a serving cell of a DU1. For example, the reference signal may be at least one of a common reference signal (CRS), a channel state information-reference signal (CSI-RS), a demodulation reference signal (DMRS), a phase tracking reference signal (PTRS), and a tracking reference signal (TRS). If the UE finds that a signal strength corresponding to the foregoing signal is greater than a specific threshold and/or that a signal strength corresponding to the foregoing signal is greater than a specific threshold exceeds a specific time, it is considered that radio link resume occurs between the UE and the DU1.

The UE sends a resume indication to a CU over an uplink of other available DUs. For example, the UE may select one or more DUs from the other available DUs to send an uplink RRC message, where the uplink RRC message includes the cell identity and the resume indication. For a specific notification method, refer to example method 1. The UE may also send the uplink RRC message to indicate the resume by using the DU1 whose radio link is resumed.

Another optional method is to define the radio link resume as a measurement Y event. For a specific method for reporting a measurement report by the UE, refer to example method 1. For example, the RRC message reported by the UE may include at least one of a cell identity, a measurement report, or a measurement identifier. After receiving the measurement report, the CU determines whether the radio link of the DU1 is resumed, and decides whether to continue to use the DU1 to serve the UE.

Example Method 3

A DU Finds and Reports Resume (Applicable to Two Cases: the DU Finds Outage or UE Finds Outage)

After finding that a radio connection to a DU1 fails, the UE may stop data transmission between the UE and the DU1, but may continue to send an uplink reference signal, for example, at least one of an SRS, a DMRS, or a PTRS. If the DU1 detects that an uplink signal of the UE is greater than a specific threshold or that an uplink signal of the UE is greater than a specific threshold exceeds a specific time, it is considered that radio link resume occurs between the DU1 and the UE. The DU1 notifies a CU of information about the radio link resume between the DU1 and the UE through an interface (F1 or V1) between the CU and the DU.

The F1 interface is used as an example. In one case, the CU is notified by using an F1 control plane message, where the F1 control plane message may include a UE identifier and/or a resume indication. The UE identifier includes at least one of an air interface identifier C-RNTI, an F1 interface identifier gNB-CU UE F1AP ID, and a gNB-DU UE F1AP ID. When the air interface identifier of the UE is included, the message may further include a cell identity. The cell identity may be at least one of a PCI, an ECGI, an NR CGI, and a cell identity agreed on between the CU and the DU. In another case, the CU is notified by using an F1 user plane message, for example, a DDDS on an F1-U user plane tunnel includes the resume indication (for example, if the DDDS is transmitted on all F1-U tunnels, one or more F1-U tunnels are selected).

Optionally, after receiving the resume indication, the CU may continue to select the DU1 to send data to the UE. The CU may notify the DU to continue transmission, and may further indicate a start F1-U sequence number. The indication may be implemented by using an F1 control plane or a user plane. Specifically, whether the DU or the UE reports a radio link failure and the radio link resume may be pre-agreed, or may be indicated by a network. For example, if the CU instructs the DU to report information about the radio link failure or the radio link resume, the DU does not add a UE reporting indication to a broadcast message, where the UE reporting indication is used to notify the UE that the radio link failure or the radio link resume needs to be reported. For example, if the CU does not instruct the DU to report the information about the radio link failure or the radio link resume (which may be an explicit notification or an implicit notification), the DU adds the UE reporting instruction to the broadcast message. Alternatively, the CU adds the UE reporting indication to the broadcast message to instruct the DU. It should be noted that the DU may alternatively report the radio link failure, and the UE reports the radio link resume; or the UE reports the radio link failure, and the DU reports the radio link resume. How to combine specific reporting manners may also be notified by the CU to the DU and the UE in an explicit or implicit manner.

It can be understood that functions of any terminal device (such as the UE), any CU, or any DU in the communication method in the second aspect according to the embodiments of this application may be implemented by executing a program instruction by a hardware platform having a processor and a communications interface. Based on this, an embodiment of this application provides a communications apparatus. The communications apparatus includes at least one processor and a communications interface, and the communications interface is configured to support communication interaction between the communications apparatus and another device. When the program instruction is executed in the at least one processor, any operation that is performed by the terminal device, the CU, or the DU and that is designed in the communication method in the second aspect of this application is implemented. Optionally, the communications apparatus may further include a memory, to store a program instruction necessary for implementing the foregoing device functions or process data generated in a program execution process. Optionally, the communications device may further include an internal interconnection line, to implement communication interaction between the at least one processor, the communications interface, and the memory. A dedicated processing chip, a processing circuit, a processor, or a general purpose chip may be considered to implement the at least one processor. The communications interface usually has a function of performing information exchange between two communication peer ends. When the communication peer ends exchange information wiredly, the communications interface may be designed as an interface circuit or a hardware module including the interface circuit, to support the wired communication interaction between the communication peer ends. For example, this interface design may be used for an F1 interface between the DU and the CU in this application. When the communication peer ends exchange information wirelessly, the communications interface may be an interface circuit with a radio frequency transceiver function or a hardware system including the interface circuit with a radio frequency transceiver function. For example, this design may be used for a communications interface between the DU and UE when wireless communication is performed between the DU and the UE.

It can be understood that the communications apparatus may be a terminal device or a system chip used in a terminal device.

An embodiment of this application further provides a computer program product. The computer program product has a program instruction, and when the program instruction is directly or indirectly executed, for example, when the program instruction is executed in the foregoing communications apparatus, the communication method in the second aspect is performed. It can be understood that the program instruction may be stored in a computer-readable storage medium or may be transmitted from a computer-readable storage medium to another computer-readable storage medium. For example, the program instruction may be transmitted from a website, computer, server, or data center to another website, computer, server, or data center in a wired (for example, a coaxial optical cable, an optical fiber, or a digital subscriber line) or wireless (for example, infrared, radio, or microwave) manner. When the program instruction is executed, considering that a specific network device generally includes a hardware layer, an operating system layer running on the hardware layer, and/or an intermediate layer, when a program instruction related to this embodiment of this application is executed, the program instruction is usually invoked and executed by a plurality of pieces of software. Therefore, the program instruction in a hardware device (a general purpose processing circuit or a dedicated processing circuit) may be an indirect execution process.

An embodiment of this application further provides a computer program storage medium. The computer program storage medium stores a program instruction, and when the program instruction is directly or indirectly executed, for example, when the program instruction is executed in the foregoing communications apparatus, the communication method in the second aspect is performed. It can be understood that, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium may be any usable medium accessible by a computer device, or a data storage device, such as a server or a data center, integrating one or more usable media. The usable medium may be a magnetic medium (for example, a floppy disk, a hard disk, or a magnetic tape), an optical medium, or a semiconductor medium (for example, a solid-state drive SSD), or the like.

An embodiment of this application further provides a chip system. The chip system includes at least one processor, and when a program instruction is executed in the at least one processor, any operation of the terminal device in the communication method in the second aspect may be performed.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
    sending, by a first network node to a second network node on each of a plurality of user plane tunnels, a message for feeding back a downlink transmission status, wherein each message sent on each of the plurality of user plane tunnels comprises one of a plurality of messages, wherein each message of the plurality of messages comprises an indication, wherein:
    the indication is used to indicate radio link outage in response to determining that the radio link outage occurs between the first network node and a terminal device; and
    the indication is used to indicate radio link resume in response to resumption of a radio link transmission from an outage between the first network node and the terminal device,
    wherein the plurality of user plane tunnels are established at a communications interface between the first network node and the second network node, wherein the plurality of user plane tunnels are associated with the terminal device, and
    wherein:
        a first message of the plurality of messages comprises information about a lost data packet, and a second message of the plurality of messages does not comprise the information about the lost data packet; or
        each of the plurality of messages comprises information about a lost data packet; or
        none of the plurality of messages comprise information about a lost data packet.

2. The communication method according to claim 1, wherein the plurality of user plane tunnels are all user plane tunnels that are established at the communications interface between the first network node and the second network node and that are associated with the terminal device.

3. The communication method according to claim 1, wherein:
    the first network node has at least one of a full or partial radio resource control processing function, a full or partial service data adaptation protocol processing function, a full or partial packet data convergence protocol processing function, a full or partial radio link control processing function, a full or partial media access control processing function, or a full or partial physical layer processing function; and
    the second network node has at least one of the full or partial radio resource control processing function, the full or partial service data adaptation protocol processing function, the full or partial packet data convergence protocol processing function, the full or partial radio link control processing function, the full or partial media access control processing function, or the full or partial physical layer processing function.

4. The communication method according to claim 3, wherein:
    the first network node has the full or partial radio link control processing function, the full or partial media access control processing function, and the full or partial physical layer processing function; and
    the second network node has the full or partial radio resource control processing function, the full or partial service data adaptation protocol processing function, and the full or partial packet data convergence protocol processing function.

5. The communication method according to claim 3, wherein the second network node comprises a first device and a second device, wherein the first device and the second device exchange information through a communications interface between the first device and the second device, and wherein:
    the first device has a packet data convergence protocol user plane processing function and the full or partial service data adaptation protocol processing function, and the second device has the full or partial radio resource control processing function and a packet data convergence protocol control plane processing function; or
    the first device has a packet data convergence protocol user plane processing function, a packet data convergence protocol control plane processing function, and the full or partial service data adaptation protocol processing function, and the second device has the full or partial radio resource control processing function; and
    the communications interface between the first network node and the second network node is an interface between the first network node and the first device.

6. The communication method according to claim 3, wherein the first network node comprises a first radio access network node and a second radio access network node, wherein a communications interface between the first radio access network node and the second radio access network node exists, and wherein:
    the first radio access network node has the full or partial radio resource control processing function, the full or partial service data adaptation protocol processing function, and the full or partial packet data convergence protocol processing function;
    the second radio access network node has the full or partial radio link control processing function, the full or partial media access control processing function, and the full or partial physical layer processing function;
    the first radio access network node and the second radio access network node exchange information through the communications interface between the first radio access network node and the second radio access network node;
    the communications interface between the first network node and the second network node is the communications interface between the first radio access network node and the second network node; and
    the second radio access network node sends, to the first radio access network node, the indication used to indicate the radio link outage or radio link resume between the first network node and the terminal device, and the first radio access network node sends the indication to the second network node.

7. A communication method, comprising:
receiving, by a second network node from a first network node on each of a plurality of user plane tunnels, a message for feeding back a downlink transmission status, wherein each message sent on each of the plurality of user plane tunnels comprises one of a plurality of messages, wherein each message of the plurality of messages comprises an indication, wherein:
the indication is used to indicate radio link outage in response to determining that the radio link outage occurs between the first network node and a terminal device; and
the indication is used to indicate radio link resume in response to resumption of a radio link transmission from an outage between the first network node and the terminal device,
wherein the plurality of user plane tunnels are established at a communications interface between the second network node and the first network node, wherein the plurality of user plane tunnels are associated with the terminal device, and
wherein:
a first message of the plurality of messages comprises information about a lost data packet, and a second message of the plurality of messages does not comprise the information about the lost data packet; or
each of the plurality of messages comprises information about a lost data packet; or
none of the plurality of messages comprise information about a lost data packet.

8. The communication method according to claim 7, wherein the plurality of user plane tunnels are all user plane tunnels that are established at the communications interface between the second network node and the first network node and that are associated with the terminal device.

9. The communication method according to claim 7, wherein:
the second network node has at least one of a full or partial radio resource control processing function, a full or partial service data adaptation protocol processing function, a full or partial packet data convergence protocol processing function, a full or partial radio link control processing function, a full or partial media access control processing function, or a full or partial physical layer processing function; and
the first network node has at least one of the full or partial radio resource control processing function, the full or partial service data adaptation protocol processing function, the full or partial packet data convergence protocol processing function, the full or partial radio link control processing function, the full or partial media access control processing function, or the full or partial physical layer processing function.

10. The communication method according to claim 9, wherein:
the second network node has the full or partial radio resource control processing function, the full or partial service data adaptation protocol processing function, and the full or partial packet data convergence protocol processing function; and
the first network node has the full or partial radio link control processing function, the full or partial media access control processing function, and the full or partial physical layer processing function.

11. The communication method according to claim 9, wherein the second network node comprises a first device and a second device, wherein the first device and the second device exchange information through a communications interface between the first device and the second device, and wherein:
the first device has a packet data convergence protocol user plane processing function and the full or partial service data adaptation protocol processing function, and the second device has the full or partial radio resource control processing function and a packet data convergence protocol control plane processing function; or
the first device has a packet data convergence protocol user plane processing function, a packet data convergence protocol control plane processing function, and the full or partial service data adaptation protocol processing function, and the second device has the full or partial radio resource control processing function; and
the communications interface between the second network node and the first network node is an interface between the first device and the first network node; and
the first device receives, from the first network node, the indication used to indicate the radio link outage or radio link resume between the first network node and the terminal device.

12. A communications device, comprising:
a communications interface, wherein the communications interface is used for information exchange between the communications device and a second communications device;
at least one processor; and
a non-transitory computer-readable storage medium coupled to the at least one processor and storing programming instructions for execution by the at least one processor, wherein the programming instructions instruct the at least one processor to perform operations comprising:
sending, to the second communications device on each of a plurality of user plane tunnels, a message for feeding back a downlink transmission status, wherein each message sent on each of the plurality of user plane tunnels comprises one of a plurality of messages, wherein each message of the plurality of messages comprises an indication, wherein:
the indication is used to indicate radio link outage in response to determining that the radio link outage occurs between the communications device and a terminal device; and
the indication is used to indicate radio link resume in response to resumption of a radio link transmission from an outage between the communications device and the terminal device,
wherein the plurality of user plane tunnels are established at a communications interface between the communications device and the second communications device wherein the plurality of user plane tunnels are associated with the terminal device, and
wherein:
a first message of the plurality of messages comprises information about a lost data packet, and a second message of the plurality of message does not comprise the information about the lost data packet; or
each of the plurality of messages comprises information about a lost data packet; or none of the plurality of messages comprise information about a lost data packet.

13. The communications device according to claim 12, wherein the plurality of user plane tunnels are all user plane tunnels that are established at the communications interface between the communications device and the second communications device and that are associated with the terminal device.

14. The communications device according to claim 12, wherein:
  the communications device has at least one of a full or partial radio resource control processing function, a full or partial service data adaptation protocol processing function, a full or partial packet data convergence protocol processing function, a full or partial radio link control processing function, a full or partial media access control processing function, or a full or partial physical layer processing function; and
  the second communications device has at least one of the full or partial radio resource control processing function, the full or partial service data adaptation protocol processing function, the full or partial packet data convergence protocol processing function, the full or partial radio link control processing function, the full or partial media access control processing function, or the full or partial physical layer processing function.

15. The communications device according to claim 14, wherein:
  the communications device has the full or partial radio link control processing function, the full or partial media access control processing function, and the full or partial physical layer processing function; and
  the second communications device has the full or partial radio resource control processing function, the full or partial service data adaptation protocol processing function, and the full or partial packet data convergence protocol processing function.

16. The communications device according to claim 14, wherein the second communications device comprises a first device and a second device, wherein the first device and the second device exchange information through a communications interface between the first device and the second device, and wherein:
  the first device has a packet data convergence protocol user plane processing function and the full or partial service data adaptation protocol processing function, and the second device has the full or partial radio resource control processing function and a packet data convergence protocol control plane processing function; or
  the first device has a packet data convergence protocol user plane processing function, a packet data convergence protocol control plane processing function, and the full or partial service data adaptation protocol processing function, and the second device has the full or partial radio resource control processing function; and
  the communications interface between the communications device and the second communications device is an interface between the communications device and the first device.

17. The communications device according to claim 14, wherein the communications device comprises a first radio access network node and a second radio access network node, wherein a communications interface between the first radio access network node and the second radio access network node exists, and wherein:
  the first radio access network node has the full or partial radio resource control processing function, the full or partial service data adaptation protocol processing function, and the full or partial packet data convergence protocol processing function;
  the second radio access network node has the full or partial radio link control processing function, the full or partial media access control processing function, and the full or partial physical layer processing function;
  the first radio access network node and the second radio access network node exchange information through the communications interface between the first radio access network node and the second radio access network node;
  the communications interface between the communications device and the second communications device is the communications interface between the first radio access network node and the second communications device; and
  the second radio access network node sends, to the first radio access network node, the indication used to indicate the radio link outage or radio link resume between the communications device and the terminal device, and the first radio access network node sends the indication to the second communications device.

* * * * *